United States Patent [19]

Hayashi et al.

[11] Patent Number: 5,742,809
[45] Date of Patent: Apr. 21, 1998

[54] DATABASE GENERIC COMPOSITE STRUCTURE PROCESSING SYSTEM

[75] Inventors: Katsumi Hayashi, Mishima; Kazuhiko Saitou, Numazu; Hiroshi Ohsato, Numazu; Masaaki Mitani, Numazu; Tomohiro Hayashi; Takashi Obata, both of Mishima; Yutaka Sekine, Numazu; Mitsuhiro Ura, Suntou-gun; Takuji Ishii, Numazu, all of Japan

[73] Assignee: Fujitsu Limited, Kawasaki, Japan

[21] Appl. No.: 899,150

[22] Filed: Jul. 23, 1997

Related U.S. Application Data

[63] Continuation of Ser. No. 427,713, Apr. 21, 1995, abandoned.

[30] Foreign Application Priority Data

Aug. 31, 1990 [JP] Japan ................................. 2-231448
Aug. 31, 1990 [JP] Japan ................................. 2-231450

[51] Int. Cl.[6] .................................................. G06F 17/30
[52] U.S. Cl. .......................... 395/602; 395/611; 395/612
[58] Field of Search ................................. 395/601, 602, 395/605, 611, 612

[56] References Cited

U.S. PATENT DOCUMENTS

| | | | |
|---|---|---|---|
| 4,829,427 | 5/1989 | Green | 364/300 |
| 5,091,852 | 2/1992 | Tsuchida et al. | 395/600 |
| 5,175,810 | 12/1992 | Young et al. | 395/600 |
| 5,257,366 | 10/1993 | Adair et al. | 395/600 |
| 5,278,978 | 1/1994 | Demers et al. | 395/600 |
| 5,408,652 | 4/1995 | Hayashi et al. | 395/600 |

Primary Examiner—Alvin E. Oberley
Assistant Examiner—Kakali Chaki
Attorney, Agent, or Firm—Staas & Halsey

[57] ABSTRACT

A database generic composite structure processing system stores data expressed by a logical structure and generates an access schedule in response to a query. The system comprises a generic composite structure element for storing definition information for associating a partial data comprising a table or a partial table expressed by a logical structure with a composite structure of a database in an independent structure in physical media, and for storing definition information for storing data and an optimizing process element for generating, according to the generic composite structure defined by said generic composite structure means, an executable module which is a concrete result of an access schedule in response to an query.

11 Claims, 16 Drawing Sheets

DATABASE GENERIC COMPOSITE STRUCTURE PROCESSING SYSTEM

This application is a continuation of application Ser. No. 08/427,713, filed Apr. 21, 1995, now abandoned.

BACKGROUND OF THE INVENTION

1. Field of the Invention

The present invention relates to a database generic composite structure processing method in a database management system and more particularly to a global index processing system in a database management system having a function of storing a table in a logical structure, or a set of data forming said table, in association with a plurality of composite structures of structured data each having an independent data organization.

2. Description of the Related Art

For a general purpose database management system to be flexible, its logical structure and storage structure must be independent of each other, and its management system must be capable of accepting the diversification of storage structures. The logical structure comprises a structure of vertical records for handling stored actual records by an upper logical language. It comprises a frame of the table, for example. The storage structure expresses how the vertical logical structure is mapped onto records on the storage structure.

That is, users require the technology for efficiently establishing a storage structure independently of a logical structure, and for improving the operation efficiency by modifying the design so that it has little influence on the logical structure associated with the application program being adopted. Data base developing engineers require technology for being provided with various storage structures in a step-wise manner.

Reference to the above described independence of data are as follows:
(References)
"The Principle of a Data Base System"
One volume of a series of Computer Science Studies, by J. D. ULLMAN, TOSHIYASU KUNII, and NOBUO OBO, published by The Japan Computer Association.

In a conventional database management system, the storage structure is generally determined automatically through the logical structure definition information. It cannot be defined independently of the logical structure.

For example, composite data can be selected only from a table which is a unit of logical structure definition. Even though a plurality of tables can be stored in one composite structure, they are determined automatically through the logical structure definition information.

The logical structure definition information for storing a plurality of tables in one composite structure originally indicates that a column value stored in a table is limited among tables. Therefore, it usually does not mean that a plurality of tables are stored in one composite structure. Namely, when the table is determined, the record to be stored in the table was automatically determined.

However, it may be determined that a data attribute in a column is to automatically store one item of table data in different composite structures. It is also demanded that one logical structure i.e. table is assigned to a plurality of composite structures. In this case, though the meaning of a data attribute in a logical structure does not refer to different composite structures, different composite structures are uniquely determined.

As described above, the ordinary concept of a composite structure of a database is limited to the method where a record in a logical structure is generally stored "as is" and many efficient access mechanisms to records have been developed. Therefore, a table in a logical structure and composite structures of a database are provided separately in the prior art technology.

As described above, in the prior art technology, the performance of database storage media and storage arrangements have an influence on the design of a logical structure. Actually, a practical query can be made only after the completion of the logical structure definition. However, a satisfactory performance evaluation on a data access speed, for example, cannot be conducted until the design of queries is completed. The logical structure and the corresponding storage structure are uniquely determined and the database should be designed considering a relation between the logical structure and the storage structure.

This causes complicated database design. Thus, composite structures should be designed in association with logical structures.

Furthermore, if a performance problem arises after the database and application program have been designed and after the program has been executed for a test, modification is required starting with the logical structure if the logical structure is not independent of the storage structure.

As an application program describes a database access in a logical structure language, modification of the local structure requires modification of the application program.

For example, when two-table join retrieval (a process where the same row can be extracted by a column value specified by two tables) must be performed at a high speed, a table must be redefined as one table made by the combination of two tables and the data must be stored again if there is only a storage structure for storing a table "as is". As a result, the name of an query table described in an application program should be changed, and the join retrieval should be rewritten when taken out from a table, and so on.

Though storage media and the storage arrangement of a database should be changed when there is a performance problem, these changes have no influence on a semantic structure of data. Therefore, a logical structure need not be changed, and an application program need not be rewritten.

The usage of a database changes with time, and the fluctuating amount of data accumulated in a database may require modification of a storage structure. Additionally, change in the importance or frequency of access requests to a database may require modification of the storage structure. Thus, a change in a storage structure often occurs during execution of a database management system as well during an initialization or test.

From the viewpoint of performance and operation, data in a database should be stored in the optimum storage structure for users in consideration of the process type and the access frequency. Then, a divided storage can be flexibly conducted for the logical structure and a data organization could be designated per composite structure such that the data organization is suitable for the data processing manner. For example, a hash organization may be selected for some data mostly random-processed among data of the same logical structure, or a Btree organization may be selected when random and sequential processes are intermixed. Such selection should be made possible for a table in a logical structure or composite data forming the table.

In a database management system capable of setting such a variable storage structure, a means for generating a more efficient access procedure is more and more required.

FIG. 1 (Prior Art) shows an example of a composite storage of a database to which the prior art technology is applied.

In the ordinary, relational database management system, composite storage in independent data definition organizations is realized by defining a duplicate table in the same logical structure. In the example in FIG. 1, tables T1, T2, and T3 in the same logical structure are duplicately defined, and the value in column A may assign a record to any of these tables, thereby realizing a divided storage with data D1, D2, and D3.

In this case, the composite data can be stored in an independent data organization. However, as the data organization information of the target data (base data) is not managed with an index, a secondary index can only be set for each group of composite data. That is, for example, secondary indexes IX-1, IX-2, and IX-3 of column C can be set individually for data D1, D2, and D3, each in an independent data organization.

Documents in reference to basic data organizations typically used in a database management system are:

1) "The Ubiquitous B-Tree", DOUGLAS COMER, ACM Computing Surveys Vol. 11, No. 2.
2) "Dynamic Hashing Schemes", R. J. ENBODYP, ACM Computing Surveys Vol. 20, No. 2.

As described above, in the process of retrieving all the data with the secondary key, each group of composite data must be retrieved with a secondary index. Specifically, in sequential retrieving with a secondary key, there is a problem that retrieving cannot be performed efficiently.

In the example in FIG. 1, when all data in tables T1, T2, and T3 are retrieved by the value in column C, each of secondary indexes IX-1, IX-2, and IX-3, set for groups of composite data D1, D2, and D3, must be retrieved individually.

The present invention realizes a highly independent storage structure for a logical structure, which establishes a storage structure capable of representing an optimum data organization in consideration of the process type and the access frequency for each unit of composite data in a logical structure, and establishes a mechanism for defining a storage structure which has the least influence on the logical structure and the application program closely related to the structure even when the storage structure must be modified for better performance and operation.

In this storage structure defining method, data can be split and stored without defining a duplicate table with the same logical structure, thus permitting definition of an independent data organization for each composite data group. However, when secondary key retrieval is required for all the composite data, secondary indexes set for composite data must be retrieved sequentially as shown by the example in FIG. 1, thus causing a problem that the retrieval cannot be performed efficiently.

SUMMARY OF THE INVENTION

An object of the present invention is to solve the above described problem, realize a storage structure highly independent from a logic structure, and easily generate an optimum database according to the data characteristics.

Another object of the present invention is to permit high speed retrieval for composite-stored data.

A feature of the present invention resides in a database generic composite structure processing system for storing data in a logical structure and generating an access schedule in response to an query, the system comprising a generic composite structure means for storing definition information for associating a table in a logical structure or composite data forming the table with a composite structure of a database in an independent structure in physical media, and for storing definition information for storing data after associating a group of composite data in a logical structure with a plurality of composite structures, associating a plurality of composite data groups with a composite structure, or combining these associating processes, an optimizing process means for generating, according to the generic composite structure defined by said generic composite structure means in response to an query written in a logical structure language, an executable module which is a concrete result of an access schedule.

Another feature of the present invention resides in a global index processing system in a database management system having a function of storing a table in a logical structure, or a set of data forming said table, in association with a plurality of composite structures of structured data each having an independent data organization, the global index processing system comprising, a dictionary for managing definition information of a secondary index covering a plurality of the composite structures, which may have different data organizations, as global index information, and an optimizing part for generating an access procedure with a global index when an access using the global index according to the registration information of said dictionary in response to an query is evaluated costwise in comparison with other accesses, and the access with a global index is less costly.

DETAILED DESCRIPTION OF THE PREFERRED EMBODIMENTS

Figure 1:
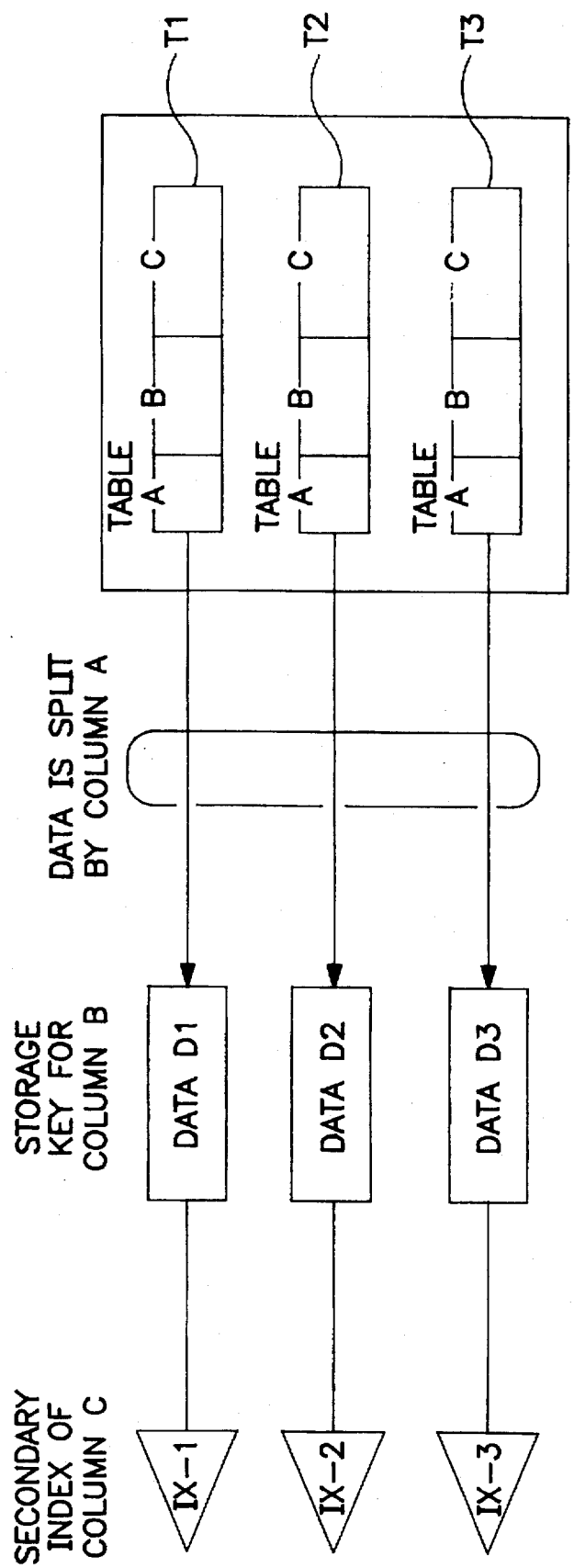
FIG. 1 (Prior Art) shows an example of composite storage of a database to which the prior art technology is applied.
Figure 2A:
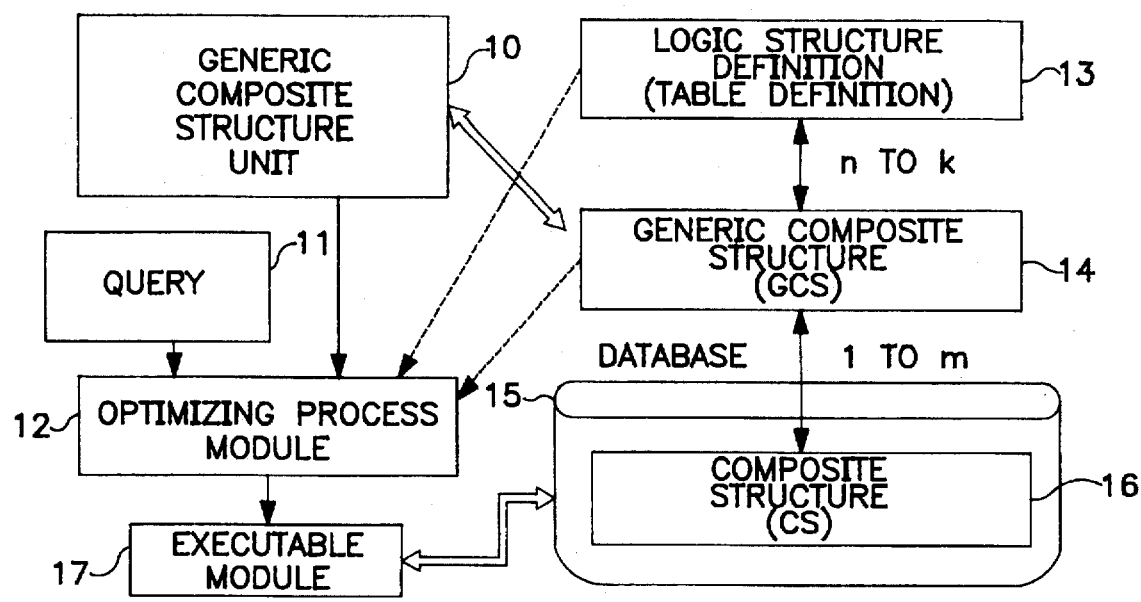
FIGS. 2(a), 2(b), 2(c), 2(d), and 2(e) are views for explaining the principle of the present invention.

As shows in FIG. 2(a), a logical structure definition 13 defines, in a logical structure expression, data stored in a database 15 like a table definition in a relational database.

A composite structure 16 refers to composite data stored in a database 15. It has an independent structure in physical media according to various data organizations (Btree, Hash, etc.), which are mechanisms for controlling the arrangement and access of records.

In the present invention, a generic composite structure unit 10 is provided where the relation between a logical structure definition 13 and a composite structure 16 is explicitly defined by a generic composite structure 14 which is managed by a generic composite structure unit 10. That is, a storage structure ordinarily determined automatically from a logical structure can be explicitly defined, and a storage structure not limited by a logical structure definition can be defined simultaneously.

The logical structure definition 13 and the generic composite structure 14 do not always correspond one to one, but n to k (n, k 0). One generic composite structure 14 processes a plurality (m) of composite structures 16; where n or k is an integer equal to or bigger than 1, but either n or k can be 0 where either the logical structure definition 13 or the generic composite structure 14 may be undefined. In this case, in response to a query which designates a logical structure definition 13 with the generic composite structure 14 undefined, a reply "no correspondences", for example, may be returned. An query referring to an undefined logical structure definition 13 is an error.

An optimizing process unit 12 generates an executable module 17 which is a practical result of an access schedule. Generation of this module 17 is according to a generic composite structure 14 defined by a generic composite structure unit 10 in response to an query 11 written in a logical structure language and using an optimum procedure.

For example, mapping with a generic composite structure 14 among tables defined by a logical structure definition 13 and composite structures (CS) 16 can be performed by combining some basic patterns as follows:

(a) Simple Mapping

The whole table is mapped into a single composite structure.

(b) Multiple Mapping

A plurality of tables are mapped into a single composite structure. In this method, the record structure of each table remains unchanged, while clustering by a key value is performed, or some records are combined into a single record before being stored. Clustering by a key value means close arrangement of records with the same key value at close positions in physical media.

(c) Column Selection Mapping

A part of a table is mapped in different composite structures SC1 and CS2 by selecting columns. As a record expressed in a logical structure is divided into a plurality of records when stored, a prime key value for uniquely identifying a record in a logical structure and a record identification number assigned to each record when stored are used as information indicating the relation between records.

(d) Overlapping Mapping

A column is duplicately mapped to a plurality of composite structures CS1 and CS2. An index in an ordinary storage structure can be realized according to this kind of mapping.

The present invention provides a function for a system designer to define mapping from a logical structure to a storage structure according to a generic composite structure. The definition of a logical structure based on a logical structure definition statement can be supported likewise in the prior art technology. Mapping can be performed to a single data organization or storage structure for each table, from a plurality of tables into a single data organization or storage structure, by partial selection of a table column, or with the same column mapped in different data organizations. Additionally, any of these methods can be used in combination. A data such as $B^+$Tree, Hash, or Heap controls an arrangement of records on a secondary storage, i.e. a disc and refers to a data arrangement method for storing or accessing data, and is determined by the storage structure. In the present invention, an optimum data organization is determined in response to an query.

These mappings can be explicitly defined as a storage structure. As a result, in response to a plurality of queries to a table, an optimum storage structure can be generated depending on the importance of performance without a limit in a logical structure.

Figure 3:
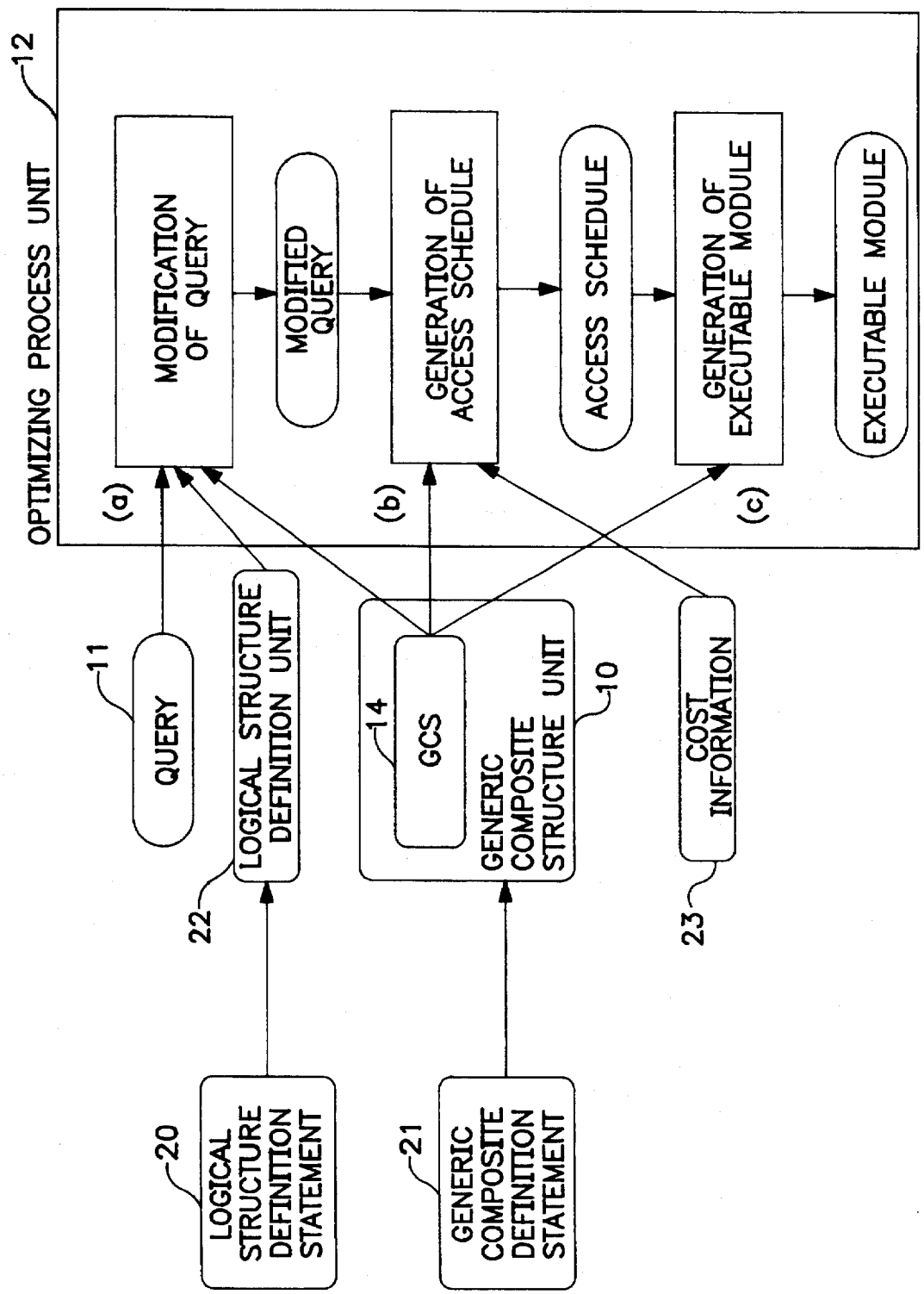
FIG. 3 shows the configuration of an embodiment of the present invention.
Figure 4:
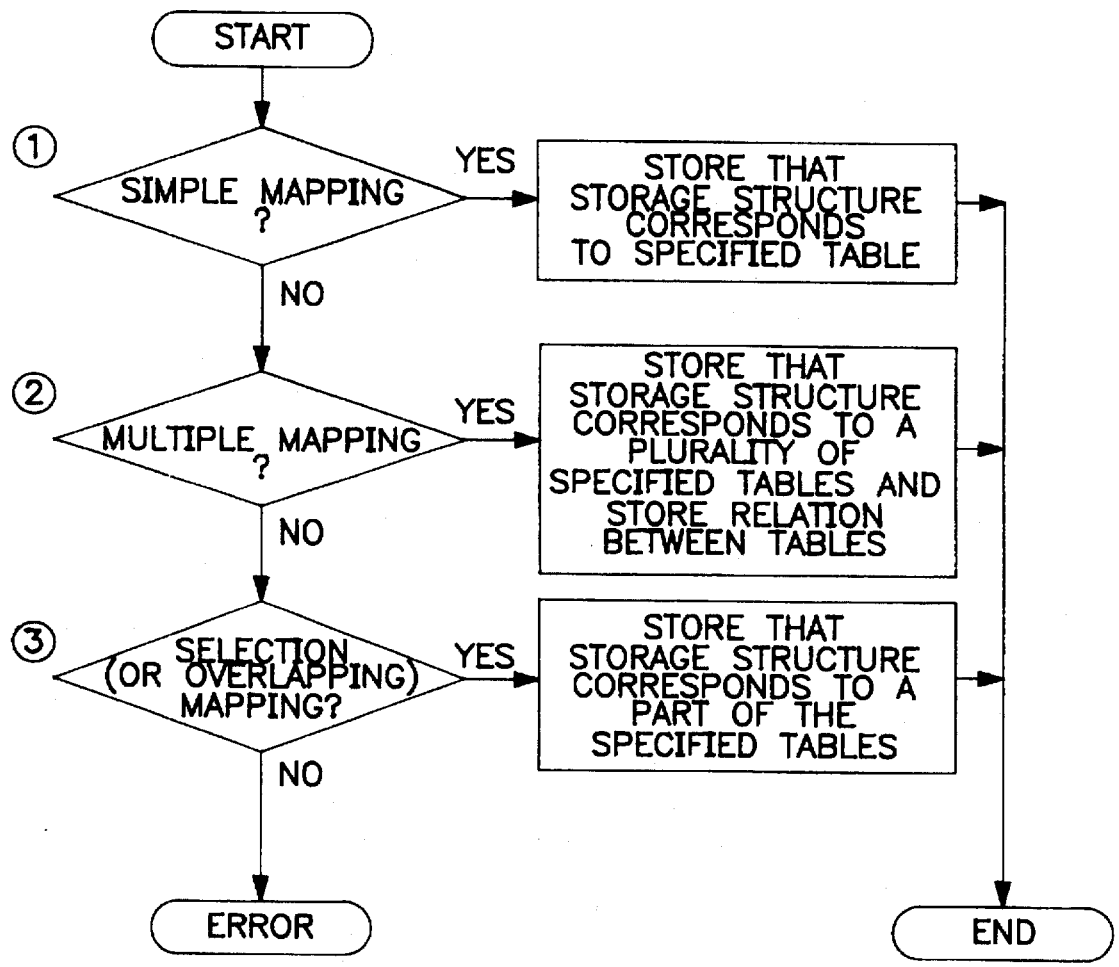
FIG. 4 shows an example of processing a generic composite structure of an embodiment of the present invention.
Figure 5:
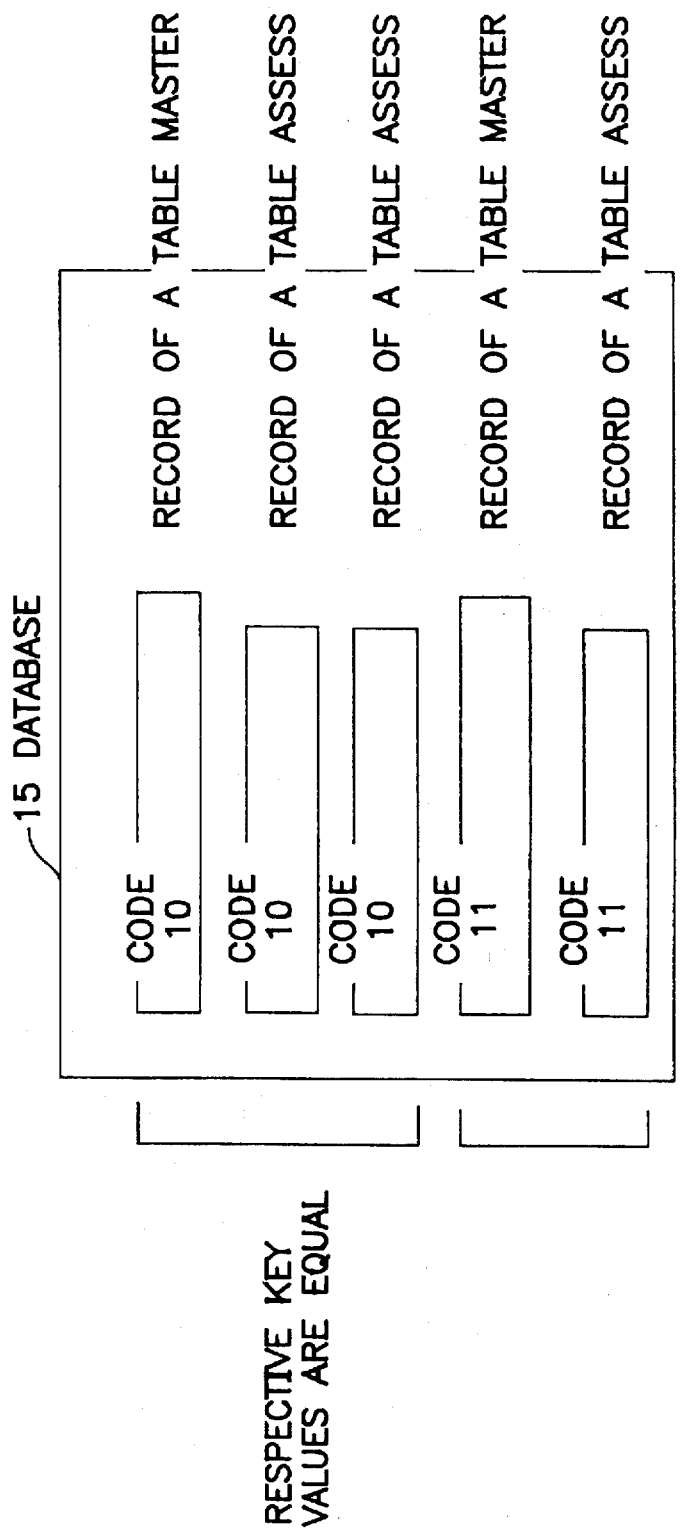
FIG. 5 shows an example of clustering storage to which an embodiment of the present invention is applied.
Figure 6:
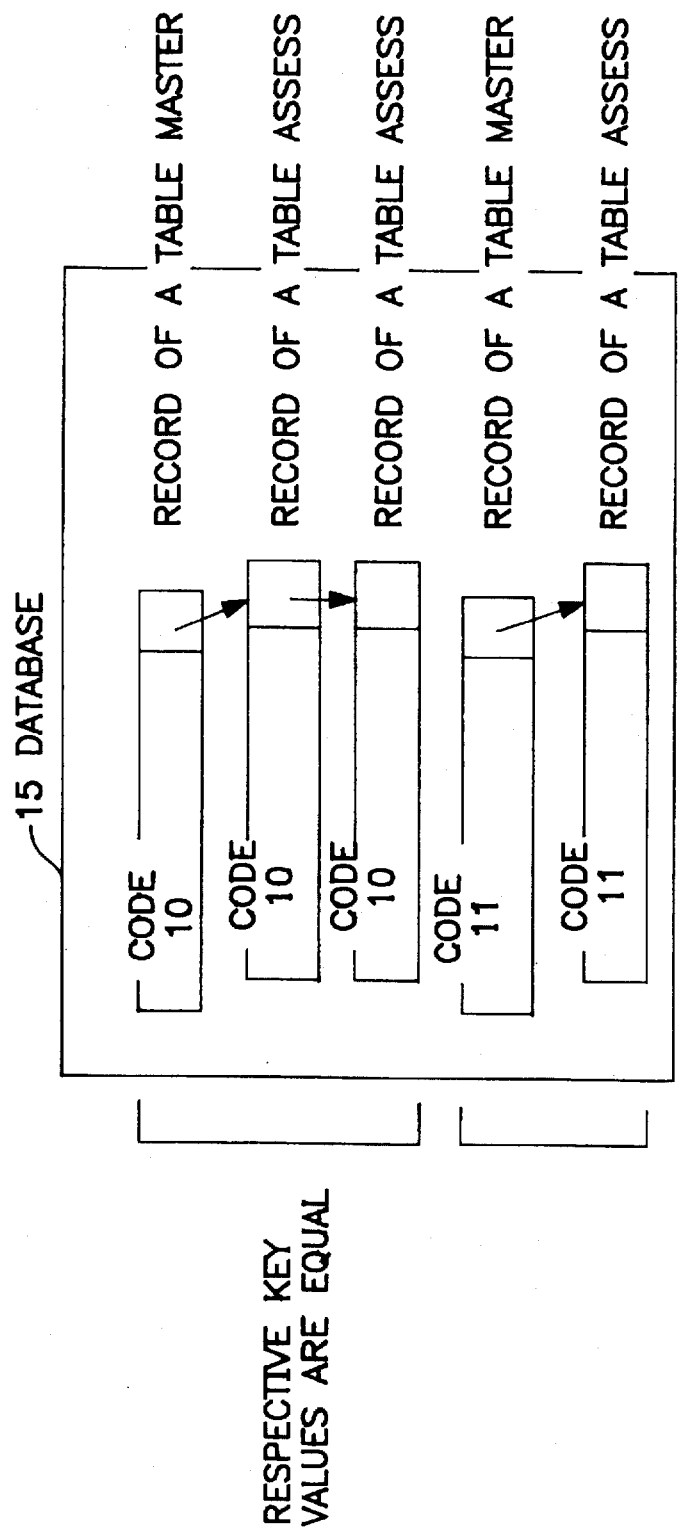
FIG. 6 shows an example of list storage to which an embodiment of the present invention is applied.
Figure 7:
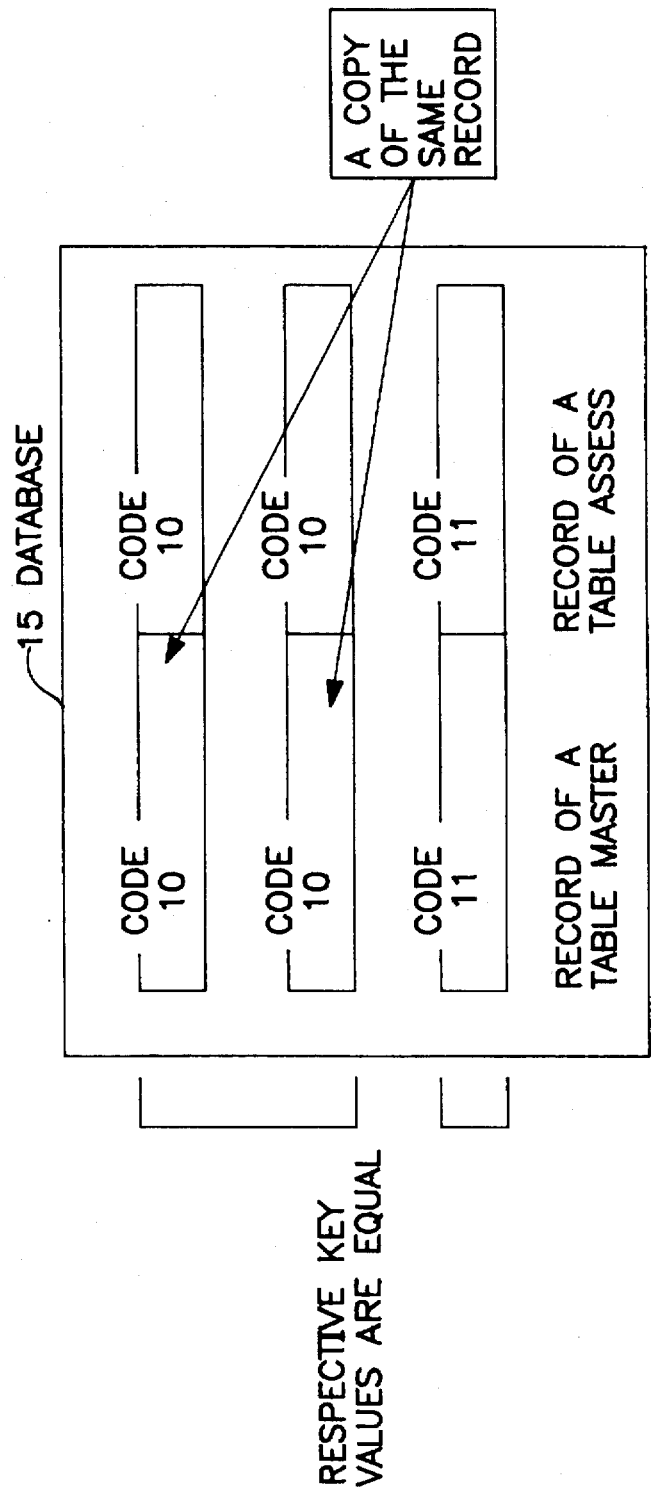
FIG. 7 shows an example of a join storage to which an embodiment of the present invention is applied.
Figure 8:
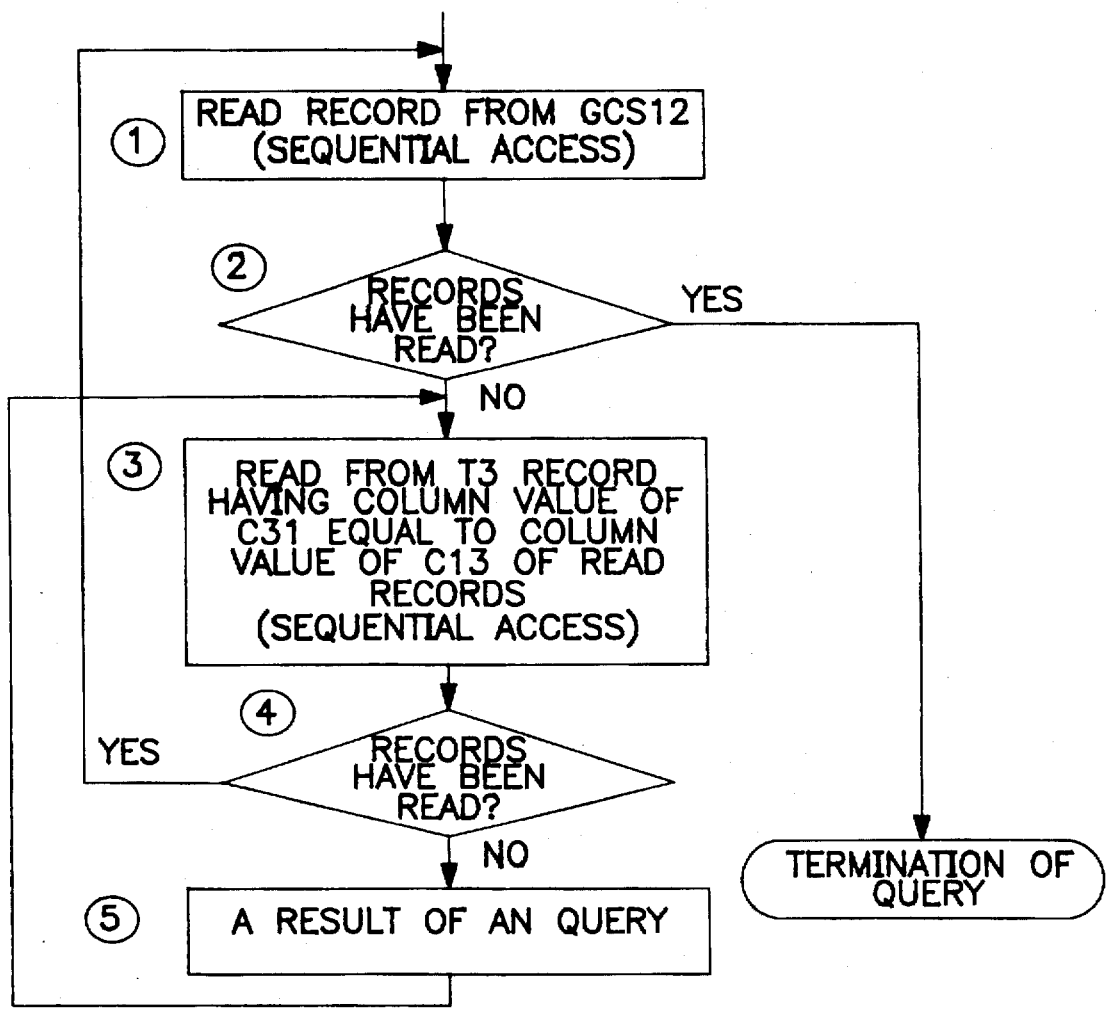
FIG. 8 shows an example of an access schedule to which an embodiment of the present invention is applied.
Figure 9:
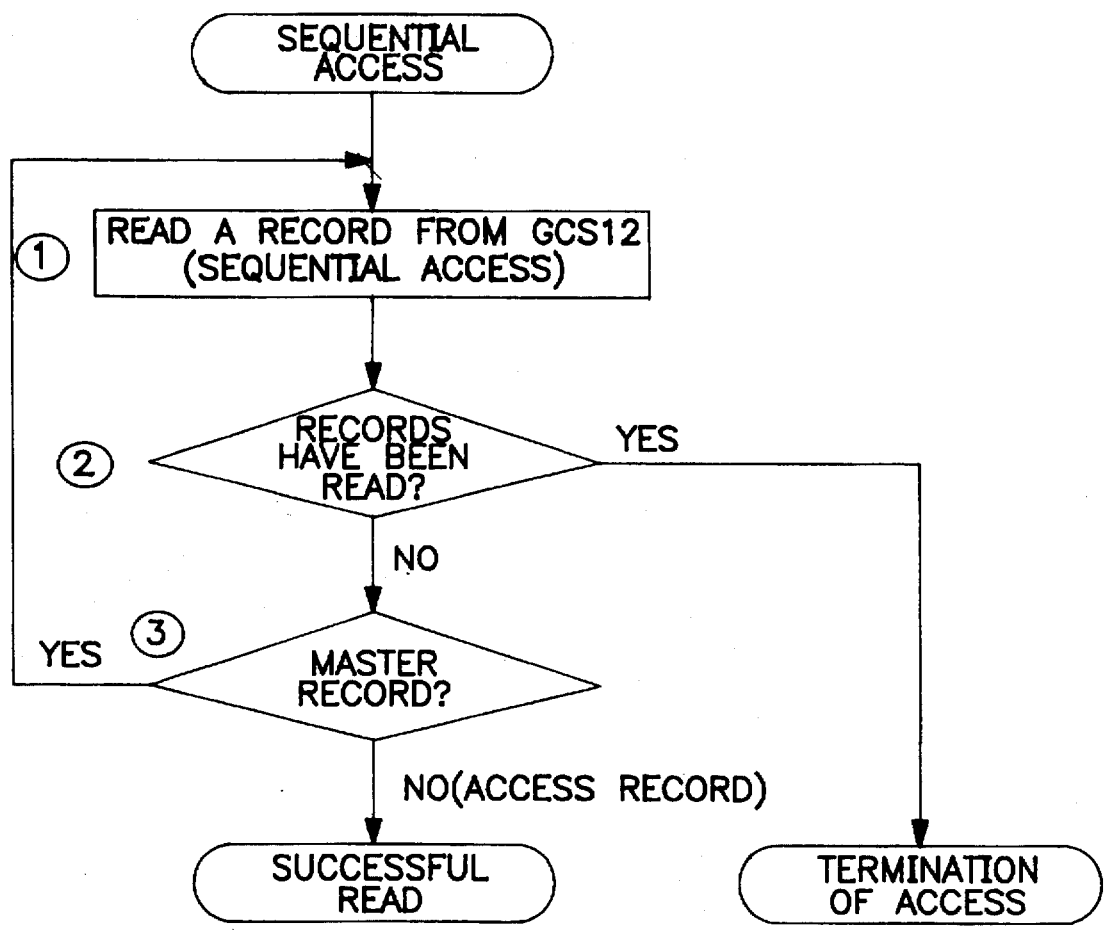
FIG. 9 example of a sequential access of records to which an embodiment of the present invention is applied.

FIG. 3 shows the configuration of an embodiment of the present invention;

FIG. 4 shows an example of a generic composite structure of an embodiment of the present invention;

FIG. 5 shows an example of clustering to which an embodiment of the present invention is applied;

FIG. 6 shows an example of a list storage to which an embodiment of the present invention is applied;

FIG. 7 shows an example of a join storage to which an embodiment of the present invention is applied;

FIG. 8 shows an example of an access schedule to which an embodiment of the present invention is applied; and FIG. 9 shows an example of a sequential access of records to which an embodiment of the present invention is applied.

A query optimizing process for receiving a storage structure defined by a generic composite structure 14 is outlined with reference to FIG. 3.

A logical structure definition unit 22 works as in the prior art technology. For example, it defines a logical structure having a record configuration according to a vertical logical structure definition statement 20 such as "CREATE TABLE" in a SQL language prescribed in "Data Base Language SQL JIS×3005—1990". In the present invention, a generic composite structure statement 21 such as "CREATE GCS" is provided. This statement 21 is inputted, causing a generic composite structure 10 to define the relation between a logical structure and a composite structure (CS) as a generic composite structure 14.

An optimizing process unit 12 performs the following steps in response to a query 11;

(a) Modification of an Query

In the optimizing process, a query 11 written in a logical structure language is analyzed and it is determined which part of the query 11 refers to which data organization. Then, the query 11 is transformed into a form representing the optimized state (intermediate language) if the structure of the query 11 meets the mapping to a data organization defined by a generic composite structure 14.

For example, if the query 11 refers to 3-table join retrieval and two of the three tables are mapped in one data organization by a generic composite structure 14, the 2-table join process can be performed successfully by a simple access to the mapped data organization as long as the mapping meets the combination condition of the query 11.

When the query 11 contains the column of a overlapping mapping, the corresponding data organization may be selected to realize the query 11. A transformation query represents a data organization of a selection target and the relation thereof. This is limited to the case where column data are referred to. Therefore, columns for update, deletion, and insertion are associated with all corresponding data organizations, not with the selection target.

(b) Generation of an Access Schedule

An access schedule expressed in a database processing procedure is generated to perform a query 11 with an inputted transformation query. An access schedule refers to an query 11 expressed in a data organization language.

In a transformation query, a plurality of selectable data organizations may be described. This is to show, by displaying a plurality of selectable data organizations, that when a column is overlappingly mapped in a generic composite structure and appears in a query, the data value corresponding to the column is overlappingly stored in a plurality of data organizations. Namely, upon arrival of a query the data organization is selected. Each data organization has a plurality of access methods. For example, one access method for a Hash data organization is to sequentially access all restored records regardless of the key value in addition to access a record by specifying a key value assigned as a storage key.

There are a plurality of access schedules available according to the selection of data organizations and the combination of an access method and sequence. The optimum schedule can be selected by estimating runtime cost. Statistical (collective) information stored in a composite structure (CS) for the cost evaluation is used to estimate the cost. FIG. 3 shows the cost information 23 for the cost evaluation.

(c) Generation of an Executable Module

An executable module for accessing a database can be generated according to the mapping information from the generic composite structure 14 to the composite structure (CS) and detailed information regarding installation, based on the prepared access schedule.

The process performed by a generic composite structure unit 10 is outlined in FIG. 4.

1. If a generic composite structure statement indicates a simple mapping, the information the storage structure corresponding one-to-one to the specified table is stored in a specified dictionary.
2. If a generic composite structure statement indicates a multiple mapping, the information that the storage table is associated with a plurality of specified tables is stored. The information relating to the relation between tables is also stored.
3. For a selective mapping (or an overlapping mapping), the information that the storage structure is associated with a part of the specified table is stored.

A generic composite structure statement 21 can specify, an identifier for specifying a generic composite structure (GCS), designation of a table or a column associated with this generic composite structure (GCS) signifying any of the above described mappings, a storage type for specifying a data organization such as a hash or a heap associated with composite structures (CS) in a database, and a data type used when data are actually stored in a database instead of a data type defined in a logical structure such as integers, real numbers, etc.

Figure 2B:
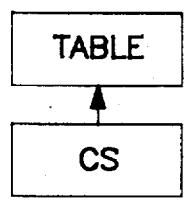
Figure 2C:
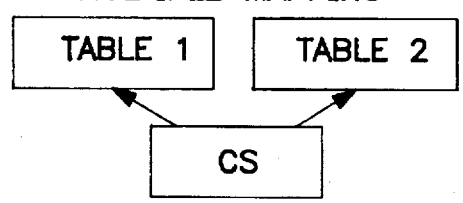
Figure 2D:
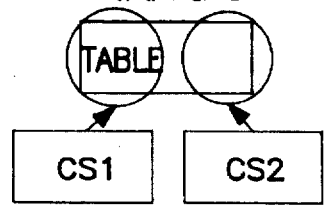
Figure 2E:
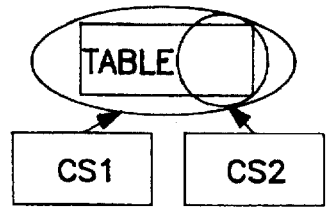

An embodiment of the present invention is explained below with reference to a multiple mapping shown in FIGS. 2(b), (c), (d), and (e). The explanation of matters well known from the prior art technology are omitted.

In a logical structure definition, a table is defined independently of a storage structure (a multiple mapping in this case). For example, a logical structure is defined by a logical structure definition statement written in the SQL language described below:

```
CREATE TABLE
    MASTER (— a personnel master table
        CODE, -- an employee code column
        NAME, -- an employee name column
        C11, C12, C13
        C14, C15 — other detailed information
        UNIQUE (CODE))
CREATE TABLE
    ASSESS (— a personnel survey table
        CODE, -- an employee code column
        C21, C22, C23,
        C24, C25, — other detailed information
        FOREIGN KEY (CODE)
            REFERENCE MASTER (CODE))
```

In this definition, the employee code column of the personnel master table (MASTER) is assigned a unique value. A value in the employee code column (CODE) of the personnel survey table (ASSESS) should match the value of one of the employee code columns of the personnel master table. That is, the definition indicates that there are personnel survey data for actual employees only.

A generic composite structure defines how these tables are stored (a multiple mapping in this case).

```
CREAT GCS
    GCS12
    CLUSTERING
    FOR MASTER, ASSES
    KEYS MASTER (CODE)
    KEYS ASSESS (CODE)
```

This definition indicates that each record of a table MASTER and ASSESS is stored after being arranged physically such that records having an equal key value are arranged closely (clustering storage).

This definition information is stored in a data dictionary as defined data by various definition functions.

FIG. 5 shows an example of the state of a database stored in accordance with such definition information.

FIG. 6 shows the state of one page in a composition structure CS in a database 15, wherein records having an equal key value (CODE) are stored adjacent to each other.

In storing a multiple mapping, list storage or join storage can be selected in addition to clustering. List storage links related records with a pointer in a list form. FIG. 5 shows an example of list storage corresponding to the above described clustering.

Join storage refers to the storage after related records are combined into one record. When a column value, a combination key, is duplicately stored, a copy of the record is made. FIG. 7 shows an example of combination storage corresponding to clustering storage.

As described above, there are a plurality of components to be selected in case of a storage for a multiple mapping and neighborhood storage of them is described below.

Suppose the following query requiring an optimizing process is received in association with the database 15.

```
SELECT C11, C12, C24, C32
FROM MASTER, ASSESS, T3
WHERE MATER.CODE = ASSESS.CODE
    AND MASTER.C13 = C31
```

In above query, a specified column value (C11, C12, C24, and C32) is obtained from a record having an equal value in each column (CODE respectively) in two tables and having an equal value in each column (C13 and C31) of another two tables.

In optimizing process, the definition information in a data dictionary is accessed, and MASTER and ASSESS are clustered. After confirming that the clustering key and the combination condition of the query match, the query is transformed to a transformation query as described below.

```
SELECT C11, C12, C24, C32
FROM GCS12, T3
WHERE C13 = C31
```

Queries to GCS12 and T3 generate a schedule using the technology of merge join and tapple substitution join as in the prior art.
(Reference)
"Decomposition—A Strategy for Query Processing"
EUGINE WONG AND KAREL YOUSSEFI
ACM TODS Vol. 1, No. 3, 1976.

For example, in the technology of tapple-substitution join, the algorithm is scheduled as shown in FIG. 8.

1 A record is read from a GCS12. This is a sequential access.
2 When the record has been read, the query is terminated.
3 A record having a column value in C31 equal to the column value in C13 of the accessed record is accessed sequentially in T3.
4 Determination is made as to whether or not the process of reading the record in T3 is completed. If yes, the process is returned to step 1.
5 If no, step 3 is performed again as a result of an query.

Sequential access from GCS12 identifies a record type (a record of a MASTER table or a record of an ASSESS table) and controls the access order. For these processes, the fact that not more than one record in a MASTER table exists as mapping to GCS and that a record in an ASSESS table is accessed following a record in a MASTER table having an equal key.

FIG. 9 shows a schedule for sequentially accessing a record as a result of a join by a key value in a MASTER table and a ASSESS table from GCS12.

1 One record is accessed sequentially from GCS12.
2 When the process is completed, the access is terminated.
3 Determination is made as to whether or not the record is a MASTER record. If yes, the process is returned to step 1 and the next record is accessed. If it is an ASSESS record, the access is determined as being successful.

In data organizations such as B+ (BTREE) and dynamic hash (DHASH), multiple mapping equals simple mapping. A data organization can be selected independently the type of mapping process.

In overlapping mapping in neighborhood storage, the only difference is that it has a table identifier in each record. This can be realized by providing a record with a special column for indicating an attributed table.

The above description relates to multiple mapping only. However, other types of mapping permit association of a logic structure with a storage composite unit.

As described above, since the present invention permits a logical structure and a storage structure to be independently designed, the complexity of the database can be greatly reduced. Furthermore, as it is not necessary to change a logical structure definition in the modification of the design for a higher performance, an application program does not need to be rewritten, thus improving flexibility and maintenance properties.

Figure 10A:
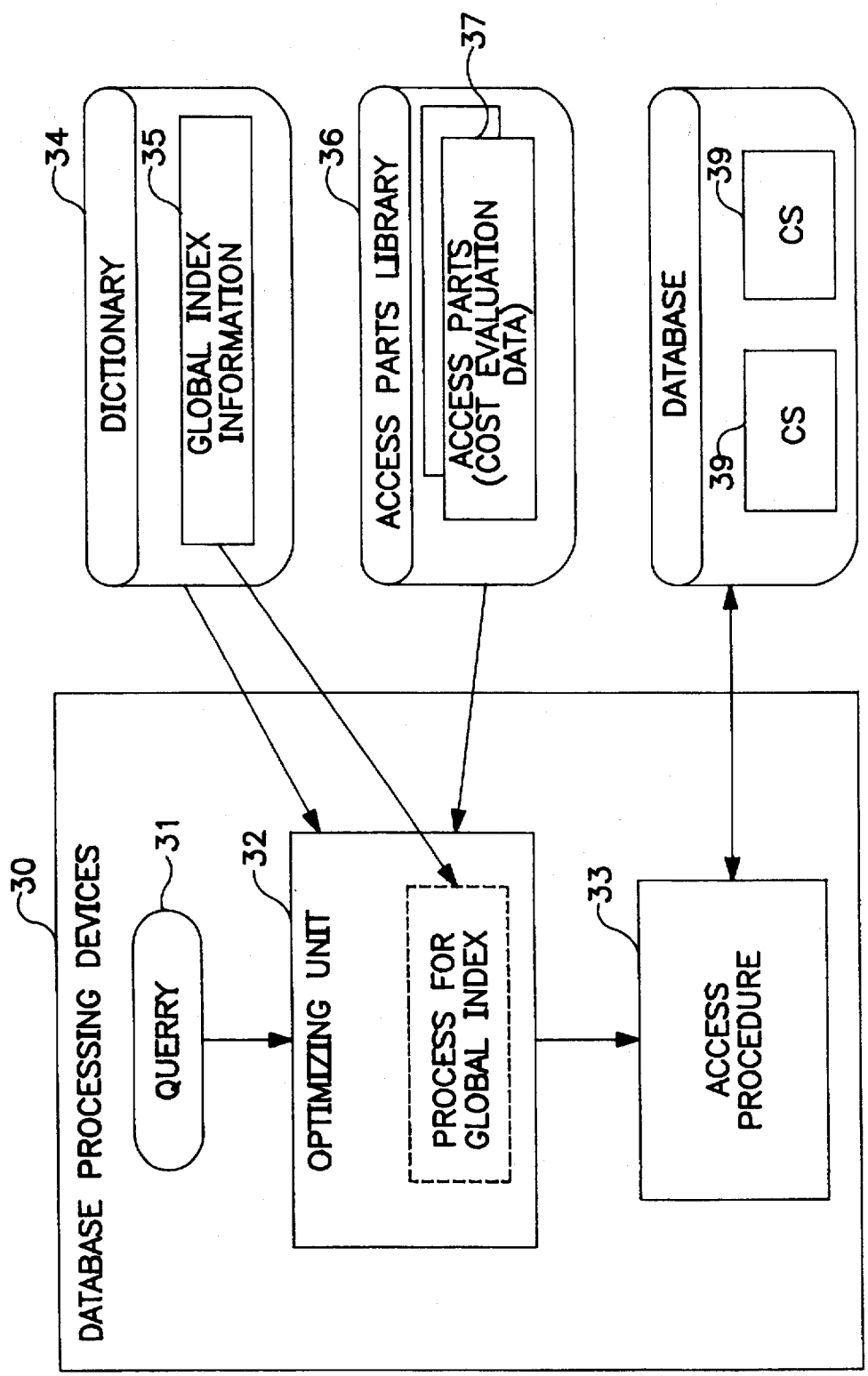
FIGS. 10A and 10B are explanatory views of the principle of the present invention.
Figure 10B:
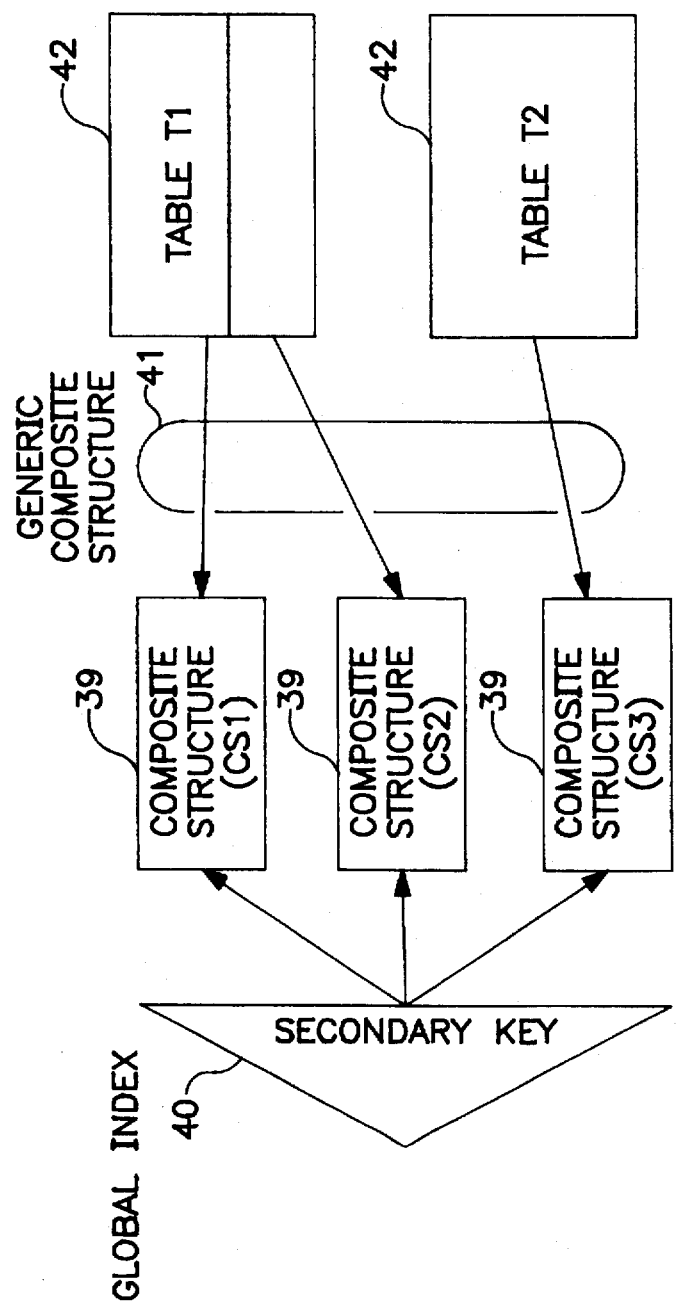

FIGS. 10A and 10B are an explanatory views of the principle of a further embodiment.

In FIGS. 10A and 10B, 30 indicates a database processing device provided with a CPU and memory; 31 a query to a database, 32 an optimizing processing unit for determining the optimum access route to a database in response to the query 31, 33 an access procedure for obtaining an answer to the query 31, 34 a dictionary for storing the definition information relating to a database, 35 global index information, 36 an access parts library for storing the information comprising parts of an accessing means to each of data organizations, 37 access parts, 38 a database, 39 a composite structure (CS: Composite Structure) comprising an independent structure in physical media, 40 a global index covering a plurality of composite structures 39, 41 a generic composite structure for defining the corresponding information between the composite data in a logical structure and the composite structure 39, and 42 a table indicating an example of composite data in a logical structure.

For example, as shown in FIG. 10B, a table 42 in a logical structure, or a set of composite data forming the table, can be associated with an optional number of composite structures 39 by a generic composite structure 41. Each of the composite structures 39 forming a database 38 has its own data organization, and a record is stored in physical media based on the storage logic.

In the present invention, an index can be set including a plurality of composite structures 39 which may be in different data organizations. This index is a secondary index for accessing data with a key (referred to as a secondary key) independent of storage logic based on a data organization to improve the efficiency of an access. The index covering a plurality of composite structures 39 refers to a global index 40.

A dictionary 34 manages global index information 35 relating to the definition information of the global index 40.

An optimizing unit 32 generates an access procedure 43 with a global index 40 when an access using said global index 40 according to the registration information of said dictionary 34 in response to an query 31 is evaluated costwise in comparison with other accesses, and said access with a global index 40 is less costly.

In FIG. 10A, access parts 37 are prepared for each data organization in an access parts library 36, and an access procedure 33 is generated according to the combination of access parts 37. However, these access parts 37 are not necessarily required for performing the process of the present invention.

The present invention provides an index function covering a plurality of data groups in a database comprising a plurality of data groups in different independent data organizations. Therefore, an access route can be diversified and the efficiency of secondary retrieval improved in comparison with the case where individual secondary indexes (hereinafter referred to as local indexes) are provided for data groups. A local index may not be required, depending on the nature of data and the state of access.

A generic composite structure 41 is associated as follows:
(a) A table 42 or a part of it is associated with a composite structure 39;
(b) A table 42, or a plurality of composite data forming the table, is associated with a composite structure 39; or
(c) A table 42, or a part of it, is associated with a plurality of composite structures 39.

Otherwise, a generic composite structure 41 refers to definition information based on the combination of (a)–(c) described above.

Figure 11:
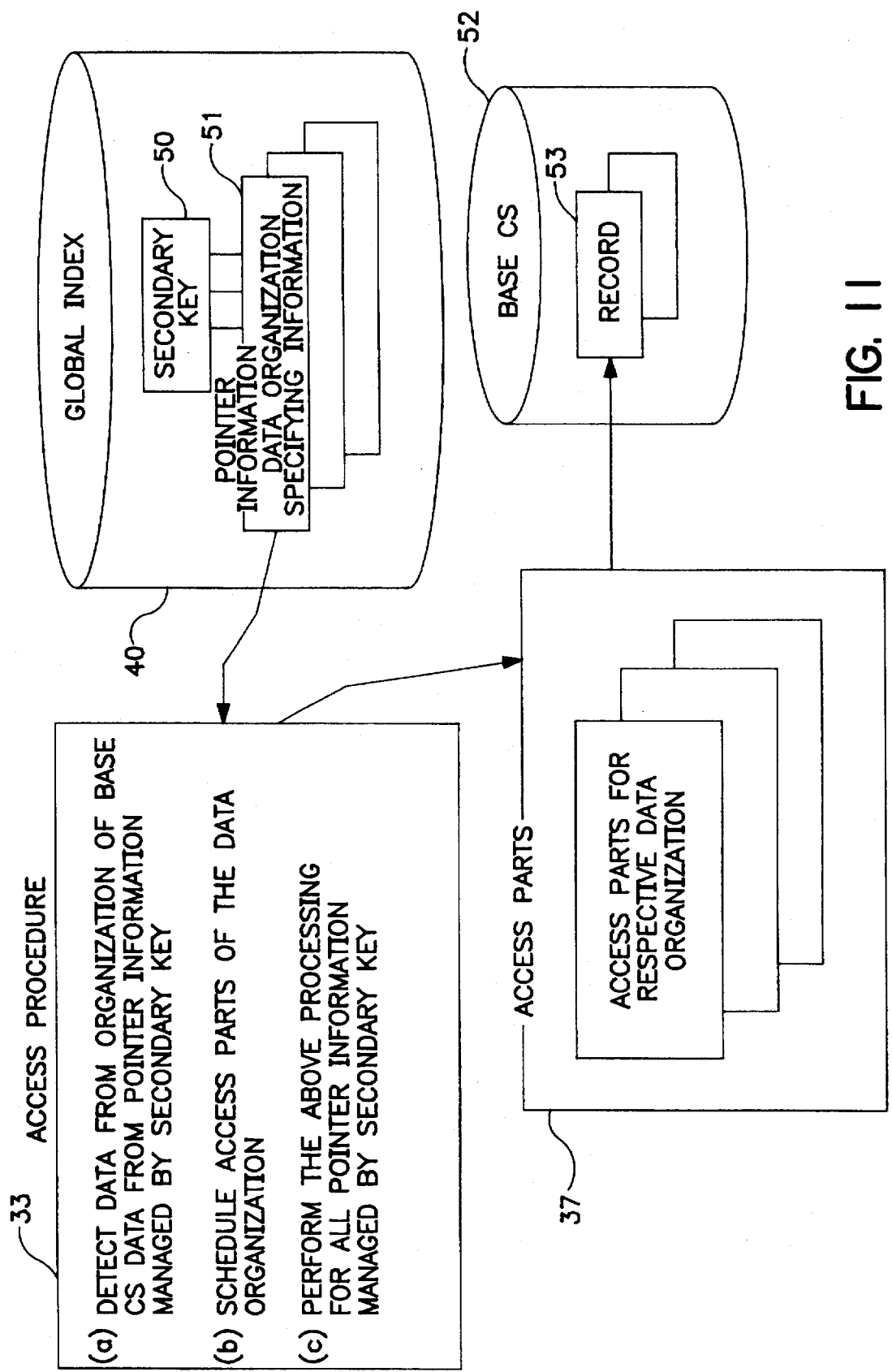
FIG. 11 is an explanatory view of an access procedure with a global index to which an embodiment of the present invention is applied.

FIG. 11 is an explanatory view of an access procedure with a global index to which an embodiment of the present invention is applied.

A global index 40, corresponding to a secondary key 50, manages pointer information 51 to a corresponding record 53 in a composite structure 52 (referred to as a base CS) in a database. Then, an index can be realized covering data in different data organizations by adding to the pointer information 51 information for specifying a data organization of the base CS 52.

In an optimizing unit 32 shown by an query 31 in FIG. 10A, an access procedure 33 can be generated with a different data organization taken in account. The access procedure 33 is generated for accessing to a record 53 with a secondary key 50 according to the sequence of processes shown in FIG. 2, when global index 40 is used.

The process for accessing the base CS 52 by the global index 40 in the access procedure 33 can be performed as follows:

(a) A data organization of the base CS 52 is detected from the pointer information 51, which is managed by the secondary key 50.

(b) Access parts 37 of the data organization are scheduled. The access parts 37 are prepared as embedded parts for an access module depending on a data organization such as Btree, heap, or hash.

(c) A corresponding record 53 can be accessed by conducting the processes (a) and (b) described above for all pointer information 51 managed by the secondary key 50, and by using access parts 37 in an appropriate combination for each data organization.

In the present embodiment, a global index 40 is managed as a composite structure (CS), and the data organization and the identification information of a target base CS 52 (CS id) are managed by a dictionary 34 as meta data. As to a base CS 52 of actual data, information such as data organization is managed by the dictionary 34 as meta data. The registration of these meta data into the dictionary 34 can be performed by a generic composite structure 41.

As described above an access procedure 33 with a global index 40 is generated by an optimizing processing unit 32 using meta data of the global index 40 managed as a CS and meta data of a base CS 52.

When retrieval is performed using a global index 40, access parts 37 forming an access procedure of each CS are scheduled according to the corresponding base CS information and the storage key for each base CS 52 is managed with the secondary key 50, enabling the corresponding record 53 to be accessed.

Figure 12:
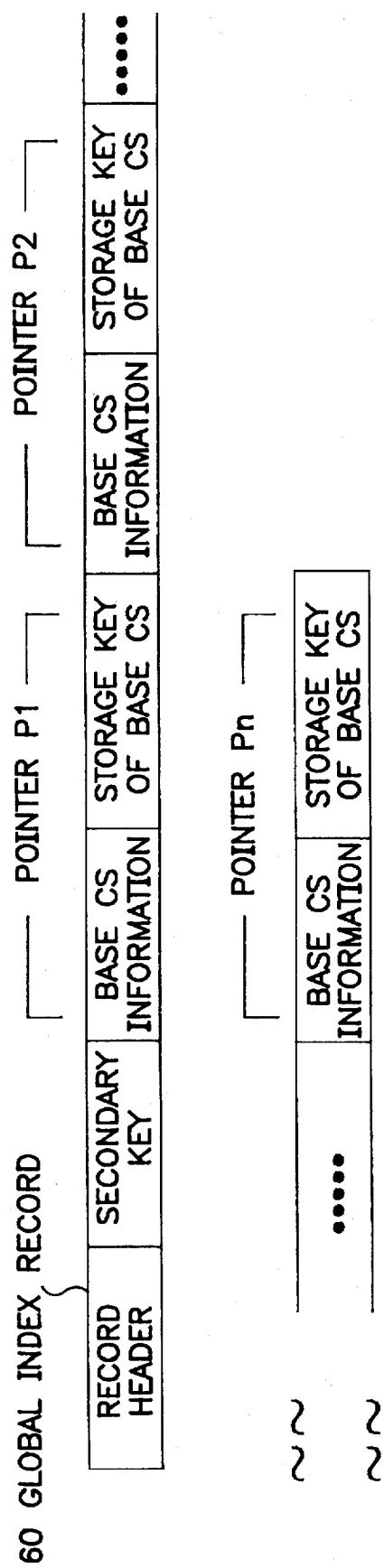
FIG. 12 shows the structure of the least significant record of the global index in an embodiment of the present invention.

FIG. 12 shows the structure of the least significant record of the global index 40 in an embodiment of the present invention.

A record header is located at the start of a global index record 60, where record management information, etc. such as the number of pointers of a base CS managed by the secondary key can be set. A single base CS can have a plurality of storage keys.

Figure 13:
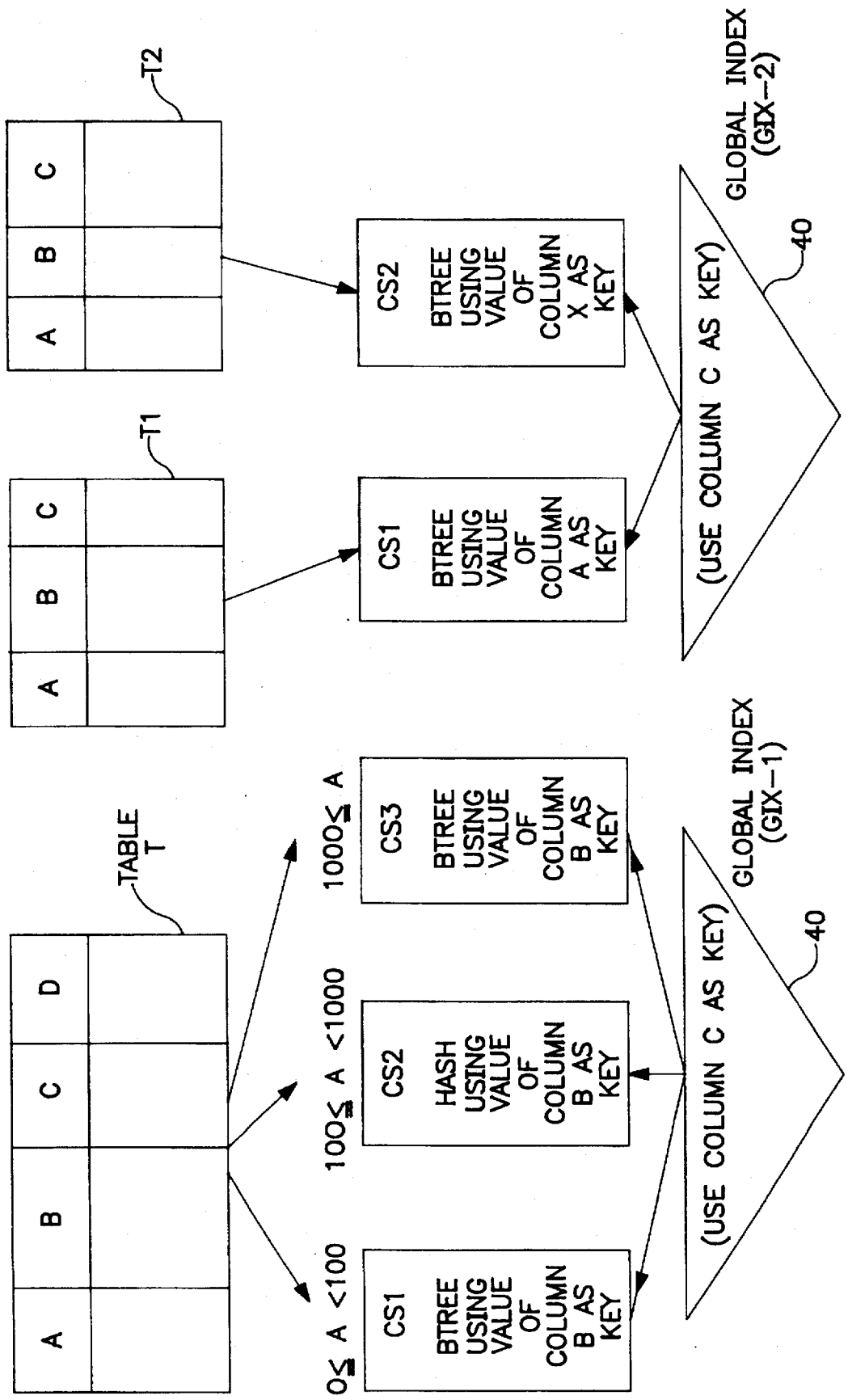
FIGS. 13A and 13B show an example of a global index to which an embodiment of the present invention is applied.

FIG. 13A shows an example of a global index 40 to a CS in a table and FIG. 13B shows an example of a global index 40 to a CS among tables.

In the example shown in FIG. 13A, a composite structure is grouped according to the value in column A in table T as follows:

(a) If the value in column A is equal to or bigger than 0 and smaller than 100, the composite structure is CS1 and the data organization is a Btree organization with the key value in column B.

(b) If the value in column A is equal to or bigger than 100 and smaller than 1000, the composite structure is CS2 and the data organization is a Hash organization with the key value in column B.

(c) If the value in column A is equal to or bigger than 1000, the composite structure is CS3 and the data organization is a Btree organization with the key value in column B.

The key value of the global index (GX-1) 40 is stored in column C, and provided covering the composite structures CS1, CS2, and CS3 in a plurality of different data organizations.

In the example shown in FIG. 13B, a composite structure CS1 is associated with a table T1, and a composite structure C2 is associated with a table T2. The data organization of the composite structure CS1 is a Btree organization with the key value in column A; and the data organization of the composite structure CS2 is a Btree organization with the key value in column X. The global index (GIX-2) 40 manages the storage key of the composite structures CS1 and CS2 with the key value in column B.

Actual process examples in FIG. 13A based on each generic composite structure, generation logic of an access procedure in the optimum process, and content of a record referred to by a global index are explained in association with FIGS. 5 and 6 as follows:

(1) Generic Composite Structure Phase

In the generic composite structure shown in FIG. 13A, a table T is split into three base CSs according to the value in column A, and each CS identifier (CS id) is defined. The data organization for the composite structures CS1 and CS3 is defined as "Btree", while the data organization for the composite structure CS2 is defined as "Hash".

Next, a global index 40 for the composite structures CS1, CS2, and CS3 is defined. The data organization of this global index 40 has a Btree index organization with the key value in column C. These data are registered in a dictionary 34 as meta data of each base CS and global index 40.

(2) Optimizing Phase

Figure 14:
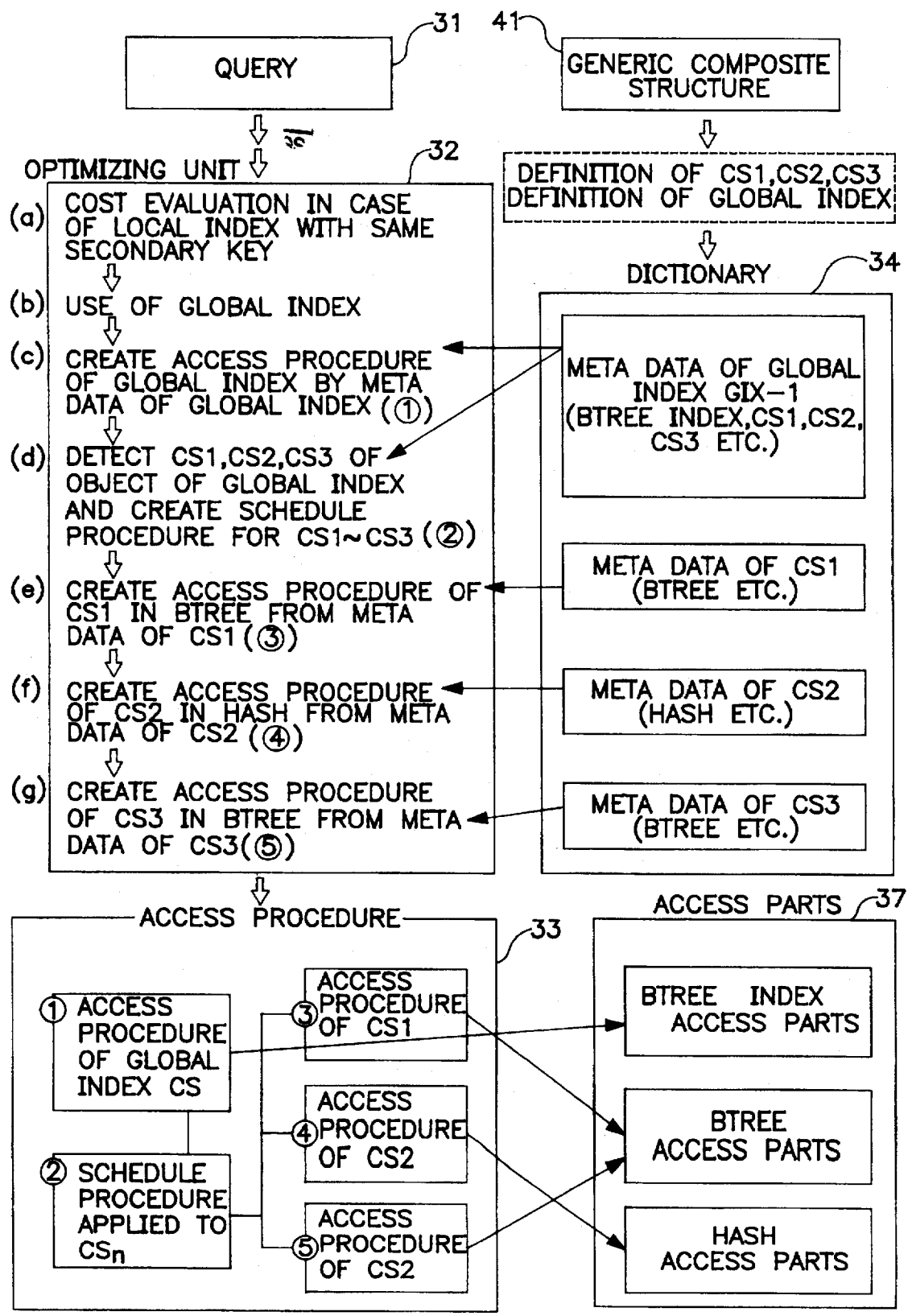
FIG. 14 shows an example of a process of generating an access procedure to which an embodiment of the present invention is applied.

In response to an query 31 using a secondary key, it is checked whether or not a local index of the same secondary key, or an individual secondary index for each composite structure exists. If yes, it is evaluated whether a global index 40 or a local index refers to the optimum path. If the path referred to by a global index 40 is judged as the optimum path and the selection is thus made, various access procedures and runtime schedule procedures such as the access procedure 33 shown in FIG. 14 are generated.

To achieve this object, an optimizing unit 32 performs the following processes according to the definition information of a dictionary 34.

(a) When a local index with the same secondary key is detected, the cost must be evaluated. Cost evaluation must also be made for the case where a global index is used.

(b) When an access with a global index is of lower cost, the global index is selected.

(c) An access procedure 1 with a global index CS is generated according to the meta data of the global index registered in the dictionary 34, where Btree index access parts are used among access parts 37.

(d) The composite structures CS1, CS2, and CS3 referred to by a global index are detected, and the corresponding schedule procedure 2 is generated.

(e) An access procedure 3 of the CS1 using Btree access parts is generated from meta data of the composite structure CS1.

(f) An access procedure 4 of the CS2 using Hash access parts is generated from meta data of the composite structure CS2.

(g) An access procedure 5 of the CS3 using Btree access parts is generated from meta data of the composite structure CS3.

(3) Runtime Process Phase

Figure 15:
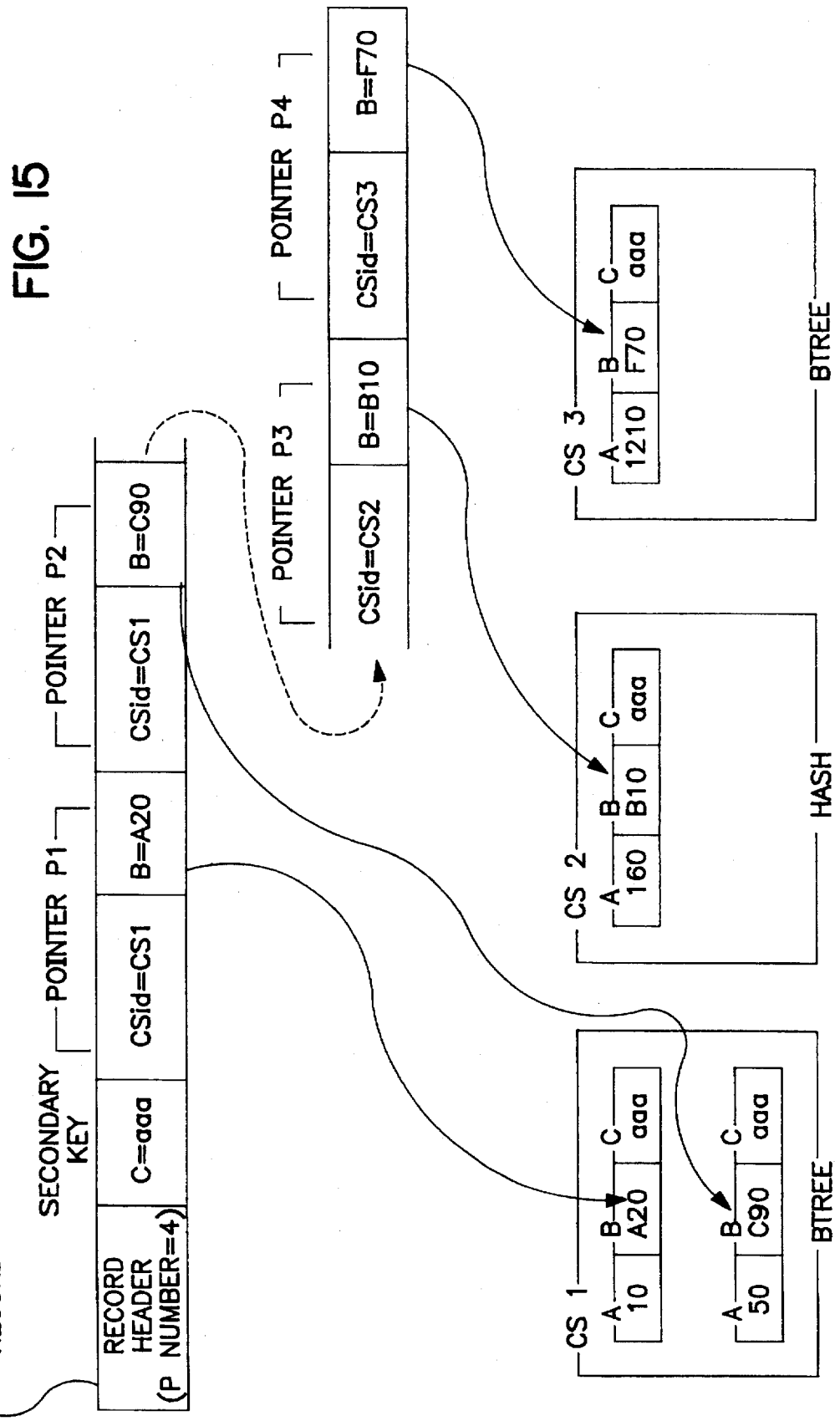
FIG. 15 shows an example of the least significant record of a global index to which an embodiment of the present invention is applied.

When an access procedure generated by the optimizing unit 32 is performed, a schedule procedure 3 to a base CSn is determined according to the content of the least significant record (pointer information) in the global index referred to by the secondary key specified at the runtime. The least significant record of the global index in this example is shown in FIG. 15.

In this case, the number of pointers in the record header information of the global index record 60 is four. Two records exist in the composite structure CS1 and one each in CS2 and CS3 for the value "aaa" in column C representing a secondary key.

At the system being executed, an access procedure is scheduled for a data organization of each CS according to the base CS information of pointers P1–P4 of the global index record 60 in association with the value of the secondary key "aaa", and then the corresponding record can be accessed.

As described above, the present invention permits retrieving operation for composite structures from the viewpoint of database organization with little deterioration in process efficiency. Concrete advantages of the present invention are as follows:

(a) A guarantee of the unique attribute of a column in all the composite data permits efficient operation when a global index is set with the column designated as a secondary key.

(b) The retrieval efficiency can be more improved when a global index is used than when retrieval is performed by a local index which is a secondary index for each group of composite data.

What is claimed is:

1. A database processing system which stores data expressed by a logical structure and generates an access schedule in response to a query expressed in said logical structure, said system comprising:

generic composite structure definition means for generating a corresponding generic composite structure definition between a plurality of logical structures and a plurality of composite structures using one of a simple mapping by making a logical structure correspond one-by-one to a composite structure, a multiple mapping by making a plurality of logical structures correspond to a composite structure, a column selection mapping by making a logical structure correspond to a plurality of composite structures, and an overlapping mapping by making a part of a logical structure correspond to a plurality of composite structures in common, or one of combinations of said simple mapping, said multiple mapping, said column selection mapping and said overlapping mapping; and optimizing process means for modifying a query written in said logical structure according to said generic composite structure, generating an access schedule based on said modified query, and generating an executable module based on said access schedule.

2. A database management system comprising:

storage means for storing data expressed by a logical structure into a plurality of composite structures, each of said plurality of composite structures having an independent data organization;

a dictionary for storing definition information of an index ranging over all of said plurality of composite structures as global index information for said logical structure, said global index information including index key information, composite structure identifying information and record identifying information for the identified composite structure;

optimizing process means for evaluating an access cost of an access which uses said global index information based on said definition information stored in said dictionary and an access which does not use said global index information; and generating an access schedule which uses said global index information when said access cost which uses said global index information is evaluated to be less costly than said access cost which does not use said global index information.

3. A data processing system for storing data expressed by a logical structure and generating an access schedule in response to a query, said system comprising:

logical structure data consisting of a plurality of data units;

storage structure data including a plurality of composite structures for actual data storage and being independent from said logical structure data;

generic composite structure definition means for generating a corresponding generic composite structure definition between a plurality of logical structures and a plurality of composite structures using one of a simple mapping by making logical structures correspond one-by-one to a composite structure, a multiple mapping by making a plurality of logical structures correspond to a composite structure, a column selection mapping by making a logical structure correspond to a plurality of composite structures, and an overlapping mapping by making part of a logical structure correspond to a plurality of composite structures in common, or one of combinations of said simple mapping, said multiple mapping, said column selection mapping and said overlapping mapping; and optimizing means for modifying a query written using said logical structure data in accordance with said generic composite structure definition, and generating an access schedule based on said modified query.

4. The system according to claim 3 wherein said optimizing means further generates an executable module which forms a result expressing said access schedule.

5. The system according to claim 3 wherein said storage structure comprises a clustering storage arrangement of records.

6. The system according to claim 3 wherein said storage structure comprises a list storage arrangement of records.

7. The system according to claim 3 wherein said storage structure comprises a join storage arrangement of records.

8. The system according to claim 3 wherein said logic structure is written in a SQL statement to specify a table.

9. The system according to claim 3 wherein a storage of data in said database is expressed as an addition of a record of said data unit to the logical structure.

10. The system according to claim 3 wherein said storage structure can be expressed by using data organization.

11. A database processing system for storing data expressed by a logical two-dimensional table structure and generating an access schedule in response to a query written in SQL, said system comprising:

logical structure data including a plurality of data units;

storage structure data including a plurality of composite structures for actual data storage and being independent from said logical structure data;

generic composite structure definition means for generating a corresponding generic composite structure definition between a plurality of logical structures and a plurality of composite structures using one of a simple mapping by making a logical structure correspond one-by-one to a composite structure, a multiple mapping by making a plurality of logical structures correspond to a composite structure, a column selection mapping by making a logical structure correspond to a plurality of composite structures, and an overlapping mapping by making part of logical structures correspond to a plurality of composite structures in common, or one of combinations of said single mapping, said multiple mapping, said column selection mapping and said overlapping mapping; and optimizing means for modifying a query written using said logical structure data in accordance with said generic composite structure definition, and generating an access schedule based on said modified query.

* * * * *

UNITED STATES PATENT AND TRADEMARK OFFICE
CERTIFICATE OF CORRECTION

PATENT NO. : 5,742,809

DATED : April 21, 1998

INVENTOR(S) : Hayashi et al.

It is certified that error appears in the above-identified patent and that said Letters Patent is hereby corrected as shown below:

Title Page, [63], should be --Continuation of Serial No. 427,713, April 21, 1995, abandoned, which is a continuation of Serial No. 07/745,258, 08/14/91, abandoned.--.

Col. 1, line 5, after "abandoned" insert --which is a continuation of Application Seril No. 07/745,258 filed Aug. 14, 1991, now abandoned--.

Col. 4, line 49, before "example" insert --is an--.

Col. 5, lines 42, 45 and 61, change "Mapping" to --mapping--;

line 53, change "Selection Mapping" to --selection mapping--.

Col. 6, line 51, change "Query" to --query--.

UNITED STATES PATENT AND TRADEMARK OFFICE
CERTIFICATE OF CORRECTION

PATENT NO. : 5,742,809

DATED : April 21, 1998

INVENTOR(S) : Hayashi et al.

It is certified that error appears in the above-identified patent and that said Letters Patent is hereby corrected as shown below:

Col. 7, line 6, change "Access Schedule" to --access schedule--;

line 31, change "Executable Module" to --executable module--.

Col. 8, lines 6, 8, 11 and 14, change " —— " to -- -- --.

Col. 12, line 25, change "Composite Structure Phase" to --composite structure phase--;

line 37, change "Phase" to --phase--.

Signed and Sealed this

Twenty-second Day of December, 1998

*Attest:*

BRUCE LEHMAN

*Attesting Officer*    *Commissioner of Patents and Trademarks*